Patented Apr. 24, 1928.

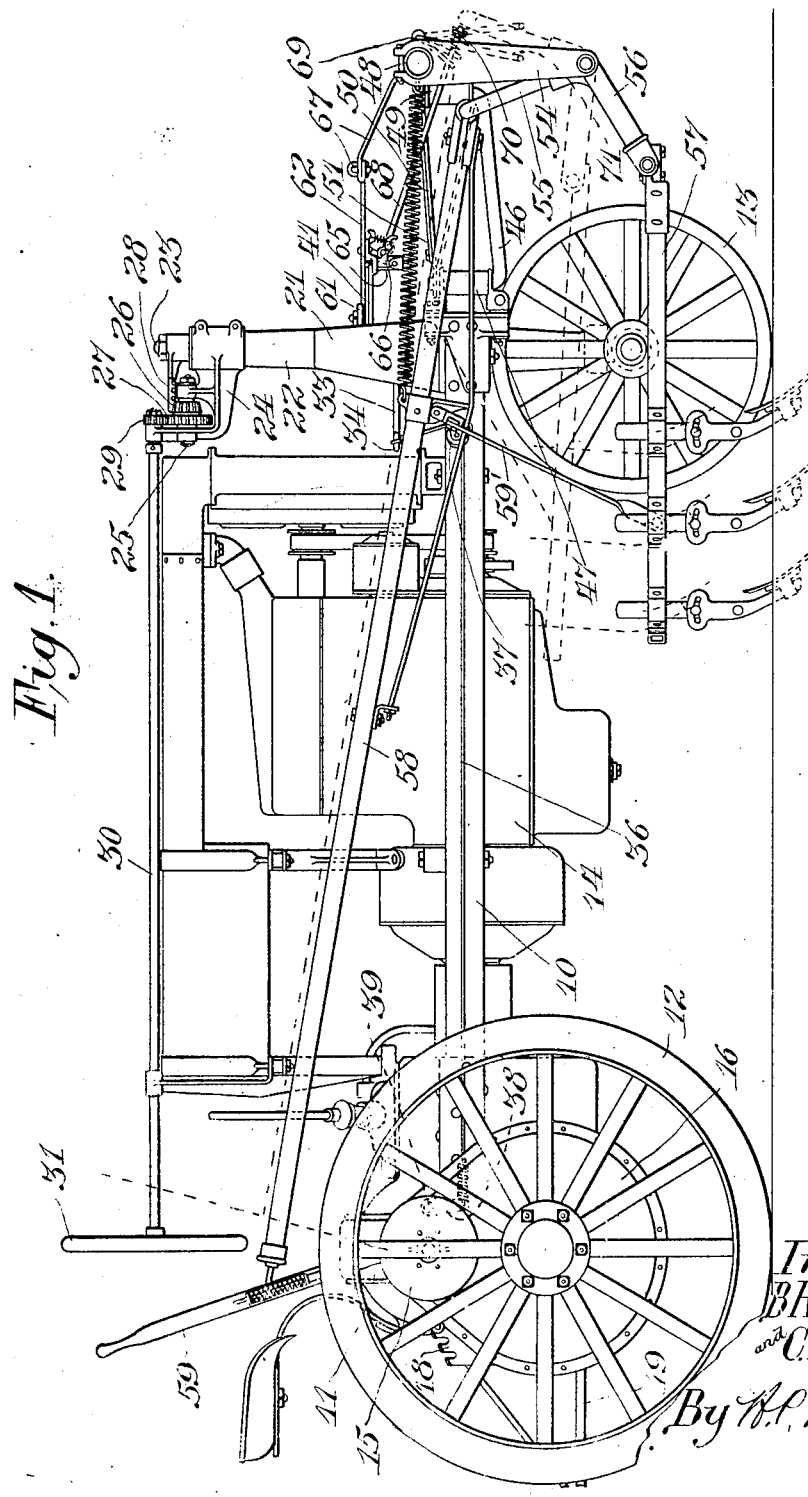

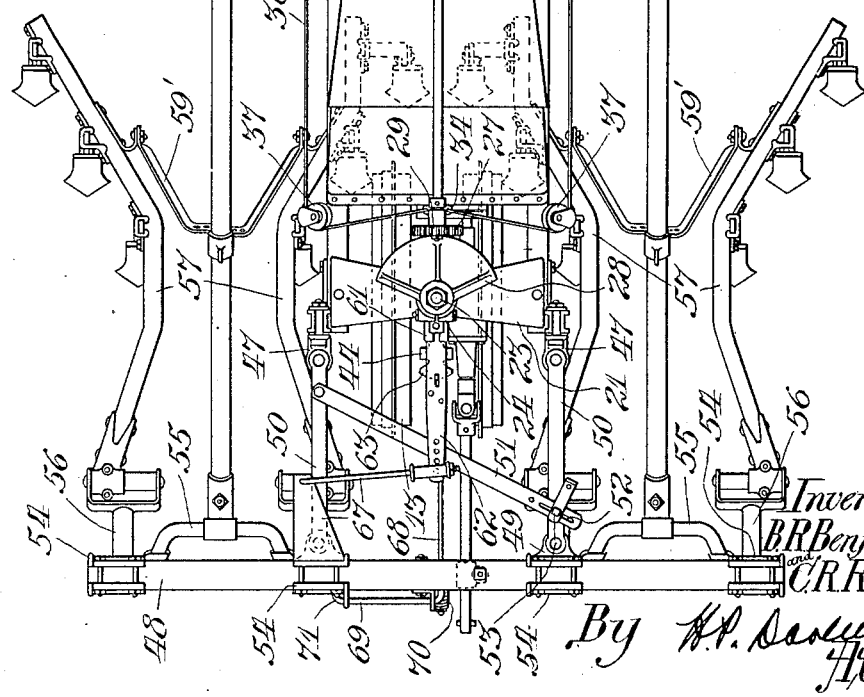

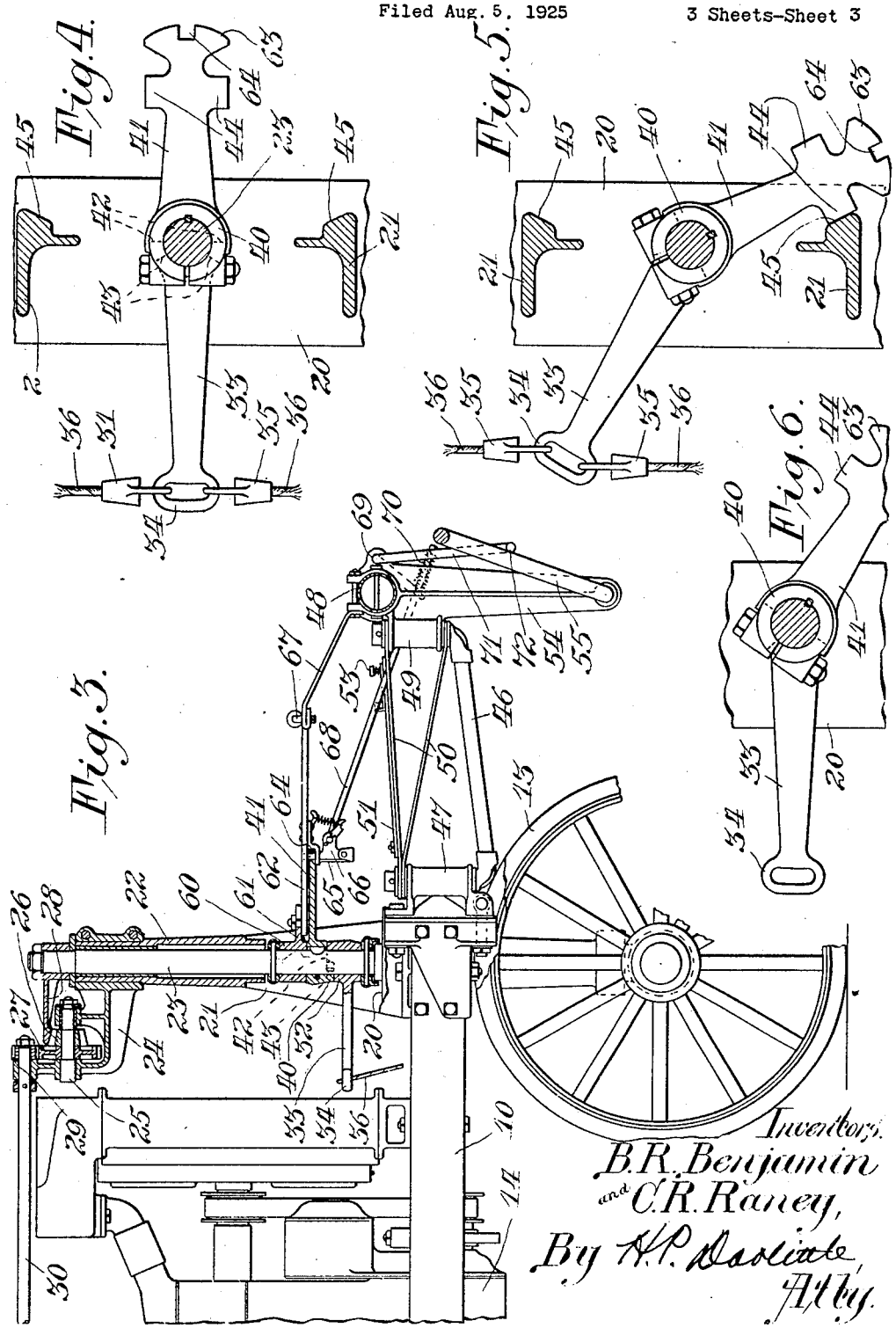

1,667,371

UNITED STATES PATENT OFFICE.

BERT R. BENJAMIN, OF OAK PARK, AND CLEMMA R. RANEY, OF CHICAGO, ILLINOIS, ASSIGNORS TO INTERNATIONAL HARVESTER COMPANY, OF CHICAGO, ILLINOIS, A CORPORATION OF NEW JERSEY.

TRACTOR CULTIVATOR.

Application filed August 5, 1925. Serial No. 48,200.

This invention relates to tractor cultivators and is directed more particularly to improvement in the means for guiding and turning the machine.

The main object of the invention is to provide a machine capable of making very short turns at the head lands when not actually working the soil and which is prevented from making such turns while the implements are in the soil, thereby obviating accidental damage to plant rows.

A further object of the invention is to provide a machine of the class stated in which the steering mechanism and cultivating mechanism are corelated in such a manner that the steering mechanism is employed to guide the cultivating implements while at work and the position of the cultivating implements in turn controls the operation of the steering means.

Another object is to provide one control for both the cultivator guiding mechanism and the implement steering means.

These and other minor objects, which will become apparent as the description proceeds, are attained by providing a tractor having differentially driven tractor wheels each of which has an independent brake and a steering truck or wheels having a delayed action coupling with each brake, and, by mounting the cultivating mechanism on the tractor in such manner that the vertical position of the cultivating tools is made to control the mechanism that operates the brakes through movement of the steering truck.

The invention accordingly resides in the organization and details of construction, or equivalents thereof, hereinafter more specifically described and illustrated in the accompanying drawings, wherein—

Fig. 1 is a side elevation of a tractor cultivator embodying the invention;

Fig. 2 is a plan view;

Fig. 3 is a detail side view of the forward end of the tractor, certain parts being shown in section; and Figs. 4, 5 and 6 are detail views in plan of the mechanism for operating the tractor wheel brakes, the parts being shown in different positions in the respective figures.

In the present embodiment of the invention the tractor carrying the cultivating device comprises a narrow main frame or body 10 supported at the rear on the transverse axle housing 11, which extends laterally beyond both sides of the frame 10 to provide widely spaced rear traction wheels 12. The forward end of the tractor is supported on a steering truck 13 which preferably has two closely positioned wheels which are located midway between the two traction wheels 12, the wheel arrangement being such that the machine can straddle two rows of growing plants such as corn. Between the side beams forming the main body 10 of the tractor there is mounted a suitable engine 14, to the rear of which are the clutch, transmission and differential housings. The axle housing 11 contains differentially driven shafts which project beyond the housing 11 at each end where they are provided with brake drums 15. Each end of the axle housing 11 has secured to it a depending gear housing 16 in which there is journaled a large gear fixed to the spindle of the traction wheel and driven by a suitable pinion on one of the differential shafts in the housing 11. The inner faces of the gear housing 16 carry brackets 17 and 18 on which is supported an arched draft bar 19, parts of which are visible in Fig. 2. The forward ends of the longitudinal beams forming the body of the tractor are connected by a crosshead preferably consisting of a single casting having a horizontally extending portion 20 and an upwardly arched portion 21 merging into a central upwardly extending, tubular portion 22. The tubular portion 22 and the horizontal portion 20 of the cross-head provide bearings for the vertical standard or spindle 23 of the truck 13 which is thus made capable of turning or swiveling to steer the machine. The upper end of the tubular portion 22 of the cross-head has clamped to it a bracket 24 carrying a short shaft 25 on which is fixed pinions 26 and 27. The upper end of spindle 23 projects beyond the bracket 24 and has fixed to it a gear sector 28 in mesh with the pinion 26. The other pinion 27 is in mesh with a pinion 29 on the forward end of a steering shaft 30 extending to the rear of the tractor in proximity to the driver's seat where it is provided with a steering wheel 31. Shaft 30 is suitably supported in bearings at the front and rear of the tractor and it will be evident that its rotation will be communicated through pinions 27 and 26 to the gear sector 28 and thus serve to steer the truck.

On spindle 23 of the truck at a point just above the horizontal portion 20 of the crosshead there is journaled a collar 32, as seen in Fig. 3, on which there is formed an integral rearwardly extending arm 33 having a terminal eye 34. The eye 34 receives two coupling links 35 attached respectively to cables 36 passing over sheaves 37 on each side of the forward end of the tractor frame and extending rearwardly to arms 38 fixed on separate brake shafts 39 controlling the brake bands on brake drums 15. Just above collar 32 (Fig. 3) there is keyed or otherwise fixed on the spindle 23 a second collar 40 having an integral forwardly projecting arm 41. The lower edge of collar 40 is stepped or cut away for substantially half its circumference to provide diametrically opposite shoulders 42, while the upper edge of sleeve 32 is similarly cut away for substantially two-thirds of its circumference to provide opposite shoulders 43 positioned to be engaged by shoulders 42 after a predetermined amount of independent movement of the spindle 23 with sleeve 40 and arm 41 has taken place. During straight forward travel of the tractor the sleeves 32 and 40, together with their arms 33 and 41, will be in the positions shown in Fig. 4, the space then existing between each of the shoulders 42 and 43 being there indicated in dotted lines. When spindle 23 is being turned to steer the tractor, the space between shoulders 42 and 43 will permit angular movement of the spindle together with sleeve 40 to an angle of substantially 45 degrees in either direction, as in Fig. 6, after which further angular movement of the spindle will cause a shoulder 42 to engage a shoulder 43, thereby rotating sleeve 32 and arm 33, as in Fig. 5, and causing tension to be applied to one of the cables 36 for applying the brake to the traction wheel on the inside of the turn being made. For the purpose of limiting the extreme range of swing of arm 41, it is provided at either side with heads 44 adapted to engage abutments 45 formed on the arched portions of the cross-head. Therefore, with the mechanism so far described it will be evident that limited steering movements of the truck 13 can be effected without actuating the brakes on the differential driving shafts for the rear wheels, but that when a short, quick turn is to be made, extreme movement of the steering truck will serve to apply the brake to the inner traction wheel thereby greatly accelerating the turn and shortening its radius.

The steering mechanism described is mechanically interrelated with cultivating mechanism preferably mounted on the forward end of the tractor and comprising forwardly projecting pivot arms 46 journaled in brackets 47 on the tractor and supporting a transversely extending implement supporting beam or member 48 to which the arms 46 are pivotally connected by means of brackets 49. Brace bars 50 are preferably employed to supplement the arms 46 and the upper ones of these bars support a diagonally extending control bar 51, one end of which is slotted as at 52 to engage a pin 53 on one of the bars 50, thus limiting the lateral swing of arms 46 and bars 50 to the extent of movement of pin 53 in slot 52 and correspondingly restricting lateral movement of the cultivating tools and angular movement of arm 41 when engaged therewith, such range of movement as is permitted by slot 52 being within the range of independent movement of arm 41 above described. The transverse member 48 has depending arms 54 which are arranged in pairs at each side of the tractor body, each pair having mounted between it an arch 55 having rearwardly extending angular arms 56 to each of which there is pivoted a cultivator beam 57. Each arch 55 has its upper portion pivotally connected to an adjusting bar 58 extending rearwardly to a point adjacent the driver's seat where it is connected to a suitable adjusting lever 59. At a suitable point intermediate its ends adjusting bar 58 is connected by a spreader arch 59' to a pair of cultivator beams 57 and it will be evident that actuation of lever 59 will cause swinging of the arch 55 and movement of the spreader arch 59' to impart a substantially vertical lift to the cultivator beams 57, as indicated in dotted lines on Fig. 1. In order to effect lateral guiding movement of the cultivating mechanism in unison with steering movement of the truck there is provided on the spindle 23 of the truck a collar 60 (Fig. 3) which is free to turn thereon and is provided with a forwardly extending notched lug 61 receiving a bolt on the rear end of a longitudinally extending coupling arm 62 positioned just above arm 41 heretofore described. This arm 41 is provided at its forward end with an arcuate head 63 having a central notch 64, and the coupling arm 62 is provided on its under side with a bracket 65 carrying a vertical spring pressed pawl 66 normally engaging notch 64. At its forward end the coupling arm 62 is connected by suitable linkage 67 with the transverse member 48, and it is accordingly possible to shift member 48 laterally and with it the cultivating tools by turning the steering truck in the ordinary way. In order to release the steering mechanism from the cultivating mechanism when the latter is not in use a pawl or latch 66 is connected by a rod 68 with one arm on a rock shaft 69 carried on member 48, a cushion spring 70 being preferably interposed between rod 68 and its actuating arm. The shaft 69 is formed with a second downwardly extending arm 71 having an angular extension, or crank, 72 extending in the path of movement of one of the arches 55, these parts being so related that forward rocking movement of arch 55 when the cultivator beams are raised will lock shaft 69 thereby exerting a pull on latch 66 through rod 68 and causing withdrawal of the latch from notch 64 thereby releasing the cultivating mechanism from the steering mechanism and permitting the free manipulation thereof to effect a short turn, if desired.

With the mechanism above described it will be evident that a construction has been devised whereby cultivating mechanism is controlled by the steering mechanism of the tractor and given an amplified range of lateral shifting movement due to mounting of the cultivating mechanism on the outer ends of forwardly extending arms 50, while at the same time the cultivating mechanism, when in use, modifies the action of the steering mechanism in such a way as to prevent excessive and injurious deviations from the proper working path, and that with the cultivating mechanism out of operating position the machine is capable of making short turns as necessary when cultivating row crops. There has, therefore, been devised a machine particularly well adapted for work between plant rows, possessing means for accurately and easily guiding the machine in its work as well as means for quickly turning it about for return travel at each end of a field. While the specific construction described presents the preferred embodiment of the invention, it will be evident to those skilled in the art that various modifications thereof are possible within the scope of the appended claims.

The particular cultivator attachment and lifting means described in connection with the present invention forms the subject matter of assignee's copending application by Benjamin et al., Serial No. 576,481, filed July 21, 1922, and the manner of supporting the attachment on the tractor forms the subject matter of assignee's copending application by Benjamin et al., Serial No. 735,740, filed Sept. 4, 1924, since issued as Patents 1,607,230 Nov. 16, 1926, and 1,539,108 May 26, 1925.

What is claimed as new is:

1. In a power propelled cultivator, the combination of a main frame, an implement frame mounted thereon for lateral movement and carrying vertically movable tool beams, means for raising and lowering the beams, dirigible carrying means supporting the front of the main frame and differentially driven traction wheels supporting the rear, individually operable brakes for the traction wheels, steering means connected to the front carrying means and the implement frame for guiding the machine and correspondingly shifting the implement frame laterally, means operable by the steering means for actuating the brakes of the traction wheel at the inner side during a turn, and means for preventing operation of the brakes by the steering means when the beams are down.

2. In a power propelled cultivator, the combination of a main frame, cultivating tools mounted thereon for lateral and vertical movement, means for raising and lowering the tools, steering wheels supporting the front of the frame and differentially driven traction wheels supporting the rear, individually operable brakes for the traction wheels, a single control device for steering the wheels, shifting the tools laterally, and applying either brake separately, means making said control device effective for shifting the tools laterally when the tools are down and ineffective when they are up, and means preventing application of the brakes by said control device when the tools are down.

3. In a power propelled cultivator, the combination of a main frame, cultivating tools mounted thereon for vertical and lateral movement, means for raising and lowering the tools, steering wheels supporting the front of the frame and differentially driven supporting wheels supporting the rear, individually operable brakes for the traction wheels, means for applying either brake separately, a single control device for steering the wheels and shifting the tools laterally, means making said control device effective for shifting the tools laterally when the tools are down and ineffective when they are up, and means preventing operation of the brake applying means when the tools are down.

4. In a power propelled cultivator, the combination of a main frame, cultivating tools mounted thereon for vertical movement, means for raising and lowering the tools, steering wheels supporting the front of the frame and differentially driven traction wheels supporting the rear, individually operable brakes for the traction wheels, means for applying either brake separately, a single control device for steering the wheels and for applying either brake separately, and means preventing the brakes from being applied by said control device while the tools are down.

5. In a power propelled cultivator, the combination of a main frame, cultivating tools mounted thereon for vertical movement, means for raising and lowering the tools, steering wheels supporting the front of the frame and differentially driven traction wheels supporting the rear, individually operable brakes for the traction wheels, a single control device for applying either brake separately, and means for preventing the brakes from being applied by said device while the tools are down.

6. In a power propelled cultivator, the combination of a frame, differentially driven traction wheels and swiveled steering wheels supporting the frame, cultivating tools mounted on the frame for vertical movement, means for raising and lowering the tools, an individually operable brake for each traction wheel, means for applying a brake after predetermined angular movement of the steering wheels in either direction, and means under control of the raising and lowering mechanism for limiting the angular range of movement of said steering wheels when the tools are down.

7. In a power propelled cultivator, the combination of a frame, differentially driven traction wheels and swiveled steering wheels supporting the frame, cultivating tools mounted on the frame, means for raising and lowering the tools, an individually operable brake for each traction wheel, means actuated by steering movement of the wheels to a predetermined degree in each direction for applying the respective brakes, and means for inhibiting such application of the brakes when the cultivating tools are down.

8. In a power propelled cultivator, the combination of a frame, cultivating tools mounted thereon for lateral movement, a swiveled steering truck supporting the front of the frame and differentially driven traction wheels supporting the rear, individually operable brakes for the traction wheels, means for steering the truck including an upright rotatable shaft, an arm journaled on said shaft and having a brake applying connection with each brake, a second oppositely extending arm fixed on said shaft and having a lost motion coupling with the first arm, means for connecting said second arm to the tools to impart lateral movement thereto, and means restricting lateral movement of the tools when so connected to within the range of independent movement of the fixed arm.

9. In a power propelled cultivator, the combination of a frame, a steering truck supporting the front of the frame having a vertical standard swiveled in the frame, means for turning the standard to steer the truck, differentially driven traction wheels supporting the rear, individually operable brakes for the traction wheels, cultivating tools supported on a forwardly projecting pivoted support in front of the truck, a rearwardly extending arm journaled on the standard and having a brake applying connection with each brake, a second arm fixed to said standard and extending over the pivoted support for the tools, cooperating stops on said arms for communicating the movement from said fixed arm to the brake applying arm after predetermined angular movement of the fixed arm, latch mechanism for connecting the tool support with the fixed arm, and means on the tool support for limiting lateral movement of said support and fixed arm to within the range of independent angular movement of said arm.

10. In a tractor having a frame supported on rear traction wheels and a central front steerable wheel truck, the combination of a brake for each traction wheel, laterally shiftable earth working tools hung from said tractor frame at each side of the wheel truck, and a common control means for angling the wheel truck, shifting the tools and applying either of said brakes.

11. The combination with a unitary tractor including a front centrally disposed steering wheel, rear traction wheels and a frame connecting and supported by said wheels, of cultivator tools, a supporting member for said tools mounted on and supported directly and solely by said tractor frame at the front part thereof, means for giving a limited steering movement to the tractor and simultaneously shifting the cultivating tools with respect to the frame, additional means for imparting a short steering turn to the tractor, and control means for effecting the above movements.

12. The combination with a unitary tractor including a front centrally disposed steering wheel, rear traction wheels and a frame connecting and supported by said wheels, of cultivator tools at each side of said front wheel, a supporting member for said tools mounted on and supported directly and solely by said tractor frame at the front part thereof, means for giving a limited steering movement to the tractor and simultaneously shifting the cultivating tools with respect to the frame, additional means for imparting a short steering turn to the tractor, and a common control means for effecting all of the above movements.

13. The combination with a unitary tractor including a front centrally disposed steering wheel, rear traction wheels and a frame connecting and supported by said wheels, of cultivating tools hung from the tractor frame and located at each side of said front wheel, means for giving a limited steering movement to the steering wheels and simultaneously shifting the cultivating tools in a movement amplified beyond said limited steering movement, additional means for imparting a short steering turn to the tractor, and control means for effecting the above movements.

14. In a tractor cultivator for use in fields prepared for row crops, the combination of a narrow tread dirigible truck forming a support for the tractor, earth working tools on each side of and behind the said truck, means actuated by steering movement of the truck for shifting the tools laterally including means providing a range of movement for the tools amplified over that of the steering movement, means complemental to the steering truck for causing a short turn of the tractor, and unitary control means for actuating the steering truck and for obtaining a short turn at the end of the rows.

15. A tractor cultivator comprising a body supported on differentially driven rear traction wheels and a forecarriage having a standard swiveled in a vertical bearing, means for turning the standard to steer the forecarriage, a brake for each traction wheel, a frame mounted on the tractor by means permitting it to have lateral shifting movement, tillage tools carried by the frame, a brake lever pivoted on the forecarriage and movable with respect to the standard, flexible connecting means extending from said lever to each brake, a projecting member fixed to said standard and movable therewith, means for connecting said member with the shiftable frame, and means on said member for swinging the brake lever after a predetermined movement of said member in either direction.

16. A tractor cultivator comprising a body supported on differentially driven rear traction wheels and a forecarriage having a standard swiveled in a vertical bearing, means for turning the standard to steer the forecarriage, a brake for each traction wheel, a frame mounted on the tractor by means permitting it to have lateral shifting movement, tillage tools carried by the frame, a brake lever pivoted on the forecarriage and movable with respect to the standard, flexible connecting means extending from said lever to each brake, a projecting member fixed to said standard and movable therewith, latch controlled means for connecting said member with the shiftable frame at will, means on said member for swinging the brake lever after a predetermined movement of said member in either direction, and means on the shiftable frame for preventing a degree of movement of said member, when connected thereto, sufficient to effect swinging of the brake lever.

17. A tractor cultivator comprising a body supported on differentially driven rear traction wheels and a forecarriage having a standard swiveled in a vertical bearing, means for turning the standard to steer the forecarriage, a brake for each traction wheel, a frame supported on the body in advance of the forecarriage by means permitting the frame to have lateral shifting movement, tillage tools carried by the frame, a brake lever pivoted on the standard, flexible connecting means extending from said lever to each brake, a forwardly projecting arm fixed to the standard, means for connecting said arm with the shiftable frame, and means on said arm for engaging the brake lever after a predetermined degree of movement of the arm.

In testimony whereof we affix our signatures.

BERT R. BENJAMIN.
CLEMMA R. RANEY.